United States Patent [19]

Navarro

[11] 4,358,079

[45] Nov. 9, 1982

[54] MOISTURE RESISTANT CLAMP FOR PORTABLE CABLES

[75] Inventor: John N. Navarro, Pasadena, Calif.

[73] Assignee: Pass and Seymour, Inc., Syracuse, N.Y.

[21] Appl. No.: 311,535

[22] Filed: Oct. 15, 1981

[51] Int. Cl.$^3$ .............................................. F16L 5/00
[52] U.S. Cl. ................................... 248/56; 174/65 R; 285/161; 403/195
[58] Field of Search .......................... 248/56, 57, 27.1; 403/195, 197, 281, 282; 285/161, 322; 174/65 R, 65 G, 65 SS

[56] References Cited

U.S. PATENT DOCUMENTS

| | | | |
|---|---|---|---|
| 3,631,738 | 1/1972 | Harper | 248/56 X |
| 4,030,741 | 6/1977 | Fidrych | 285/161 |
| 4,089,496 | 5/1978 | Mizusawa | 248/56 |
| 4,145,075 | 3/1979 | Holzmann | 285/161 X |
| 4,234,218 | 11/1980 | Rogers | 248/56 X |
| 4,250,348 | 2/1981 | Kitagawa | 285/161 X |

Primary Examiner—William H. Schultz
Assistant Examiner—Ramon O. Ramirez
Attorney, Agent, or Firm—Blakely, Sokoloff, Taylor & Zafman

[57] ABSTRACT

A cable clamp is disclosed for securing a cable passing through a hole in a wall or the like. A fluid resistant seal between the clamp and the cable passing through the clamp is formed as the cable is being secured within the clamp. The cable clamp comprises a generally tubularly shaped body portion with two rows of overlapping tapering axial projections at one end, a generally tubularly shaped elastomeric member disposed between the two rows of projections, a nut for securing the clamp to a wall or the like and a nut for securing the cable within the clamp.

7 Claims, 6 Drawing Figures

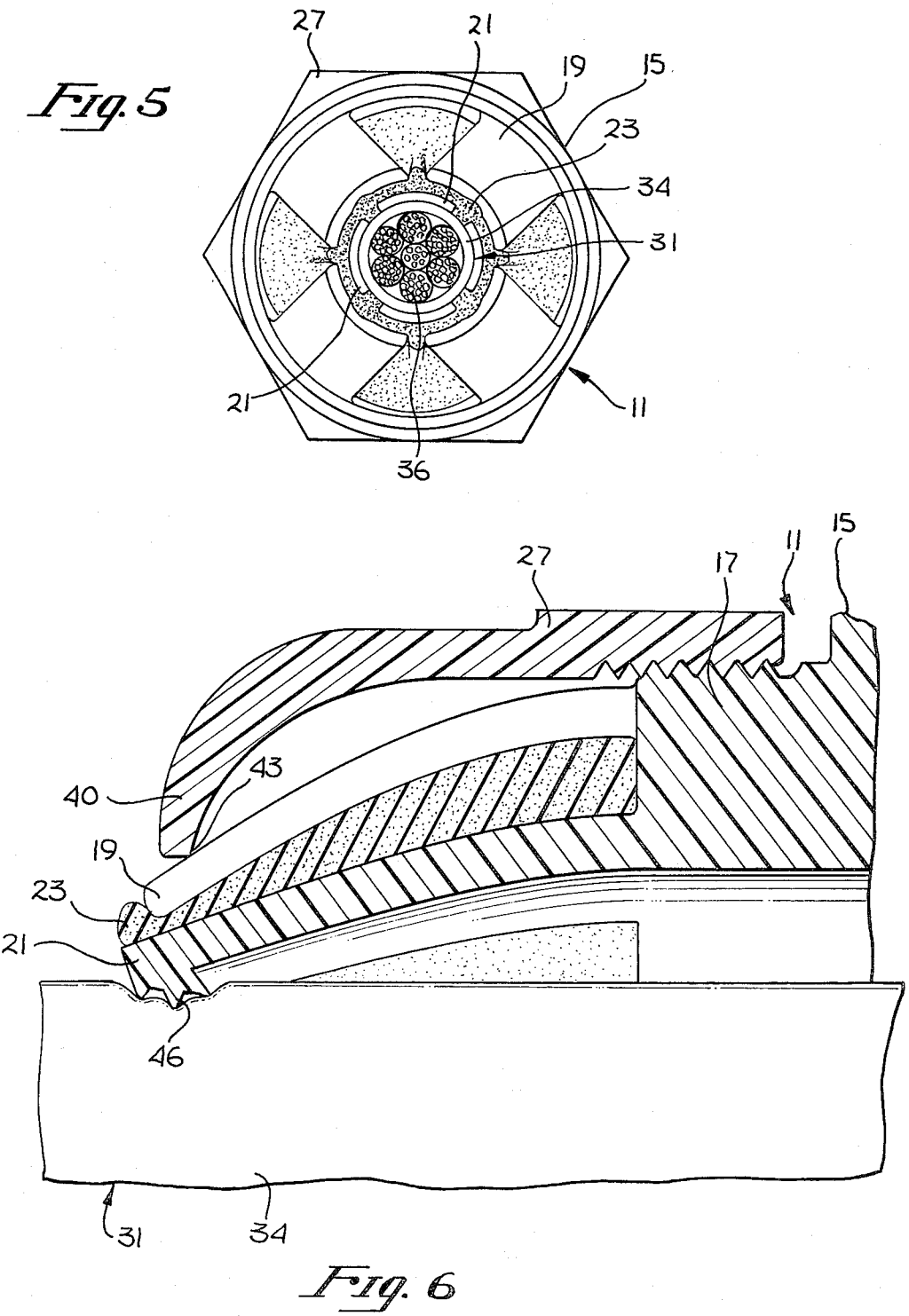

MOISTURE RESISTANT CLAMP FOR PORTABLE CABLES

PRIOR ART STATEMENT

It is frequently necessary to pass medium to heavy duty electrical cables through walls and the like such that the cable may be secured so that the cable cannot be pulled through the wall. Prior art devices used to secure cables in this manner generally comprise two generally tubular shaped members, one fitting inside the other. The outer member passes through an opening in a wall or the like and is secured thereto by various means. A cable passes through the inner member and by twisting the inner member relative to the outer member, the cable is gripped by the device securing the cable. See for example the devices disclosed in U.S. Pat. Nos. 3,300,163; 4,108,507 and 4,169,572.

In addition to securing a cable which passes through a wall such that it cannot be pulled through the wall, it is also frequently necessary to have a fluid resistant seal between the cable, the device and the wall. For example, when a electrical apparatus is contained within an outdoor enclosure, an opening in the enclosure must be provided for the passage of a power cable connected to the apparatus. In addition to having means to prevent the cable from being pulled out of the enclosure, it is also desirable that water or other fluids not enter the enclosure through the opening for the power cable. While it is known to build an enclosure for electrical apparatus which has means for passing a cable therethrough with a water resistant seal, there are frequently occasions when a temporary enclosure is needed and the expense of a complete enclosure especially adapted for such use cannot be justified.

While the three above mentioned United States Patents have means for securing a cable, they do not include means for providing a fluid resistant seal of the above-mentioned type. In U.S. Pat. No. 3,584,888 a cable gland for securing a cable and providing a fluid resistant seal is disclosed. The device comprises a grommet of resilient material having a tapered axial hole which is distended by a cable when forced into the gland so that radial pressure is exerted on the cable. This radial pressure forms a fluid tight seal between the grommet and the cable. The grommet has a reduced diameter portion which is encircled by a collar which can be tightened by, for example, a screw so that axial displacement of the cable is prevented. The gland is molded from a rubber or other resilient material and it is forced into a hole in a wall or the like so that the edge of the wall or the like fits into an annular groove on the outer surface of the grommet. A cable passes through the interior of the grommet which has a tapered hole to permit an easy introduction of the cable into the hole. The diameter of the hole at approximately half the length of the grommet equals that of the cable. Therefore, when the cable is forced into the hole, the reduced diameter portion is expanded and a fluid tight seal is formed between the grommet and the cable. The collar fits around the grommet and the cable and by tightening a bolt passing through the ends of the collar, teeth on the inner surface of the collar bite into the grommet and compress it onto the cable thus firmly securing the cable to the gland.

Other references which are known to the inventors herein which while related to the subject matter hereof, are not considered to be relevant thereto are U.S. Pat. Nos. 3,631,738; 3,243,206 and 3,365,216.

SUMMARY OF THE INVENTION

A cable clamp for securing a cable passing through a hole in a wall or the like is disclosed. A fluid resistant seal between the clamp and the cable passing through the clamp is formed as the cable is being secured within the clamp. A single clamp is capable of securing cables of different diameters, which diameters may vary over a relatively wide range.

The cable clamp comprises a generally tubularly shaped body portion, a generally tubularly shaped elastomeric member, a nut for securing the clamp to a wall or the like and a nut for securing the cable within the clamp. One end of the body portion is threaded, which end passes through a hole in the wall. A flange disposed intermediate the ends of the body portion lies adjacent one side of the wall, the threaded end protruding through the other side of the wall. The nut for securing the clamp to the wall screws onto the above-mentioned threaded end. The clamp is secured to the wall as the nut is tightened by the action of the nut engaging one side of the wall and the flange engaging the other side of the wall.

The other end of the body portion has two rows of overlapping tapering axial projections, with the generally tubularly shaped elastomeric member disposed between the two rows of projections. The separation between the two rows of projections allows the elastomeric member to be inserted therebetween. The elastomeric member is slightly compressed between the two rows of projections thereby holding it in place after insertion.

The nut for securing the cable within the clamp is threaded onto threads on the body portion, which threads are disposed between the flange and the outer row of projections. The end of the nut opposite its threaded end tapers inwardly such that a shoulder at this end bears against the outer row of projections. As the nut is tightened, the outer row of projections is increasingly pressed inward by pressure exerted by the shoulder. The inward pressure forces the inner row of projections to increasingly engage the cable while the elastomeric member flows to fill the gaps between the projections on each row. Small, radially directed teeth at the tapered ends of the inner row of projections grip the outer sheathing of the cable passing through the clamp. A water resistant seal is formed between the teeth and the cable sheath by the deflection of the sheath by the teeth, between the two rows of projections by the elastomeric member, and between the outer row of projections and the cable securing nut by the deflection of the elastomeric body as it flows to fill the gaps between the outer row of projections and inner surface of the cable securing nut.

BRIEF DESCRIPTION OF THE DRAWINGS

FIG. 5 is a side section taken along line 5—5 of FIG. 4.

FIG. 6 is a plan view of the cable securing nut showing the inner surface teeth gripping the sheath of the cable.

DETAILED DESCRIPTION

Figure 1:
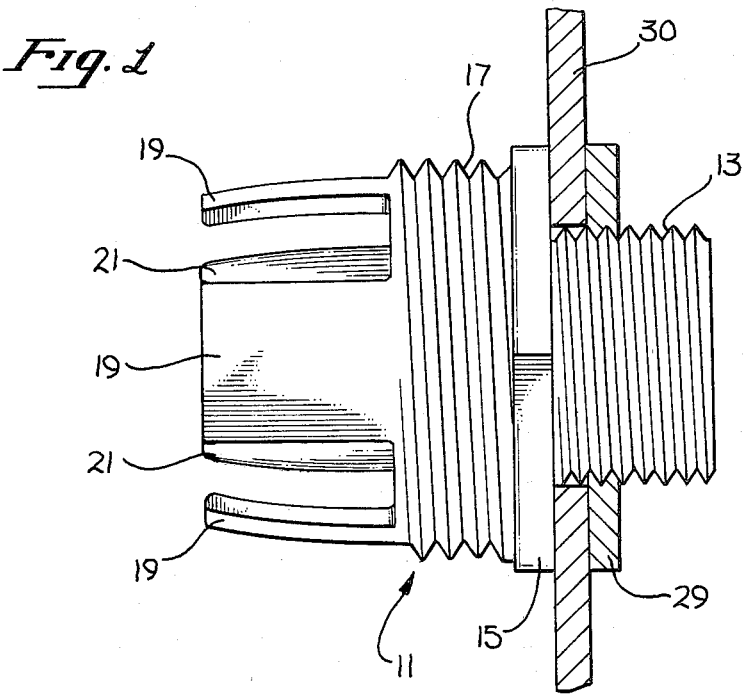
FIG. 1 is a side elevation view of the clamp.

Referring to FIG. 1, a generally tubularly shaped cable clamp 11 as disclosed herein comprises a first threaded portion 13 extending from an end of the clamp to a flange 15 disposed intermediate the ends of the clamp; an outer row of tapering, generally rectangular, axial projections 19 extend from the other end of the clamp to a second threaded portion 17 disposed intermediate the projections 19 and the flange 15; and an inner row of tapering, generally rectangular axial projections 21 disposed in overlapping relationship with the outer row of projections 19. That is, gaps between the inner row of projections 21 are overlapped by the outer row of projections 19. The respective projections of each row lie in substantially the same tapering circumferential plane.

Figure 2:
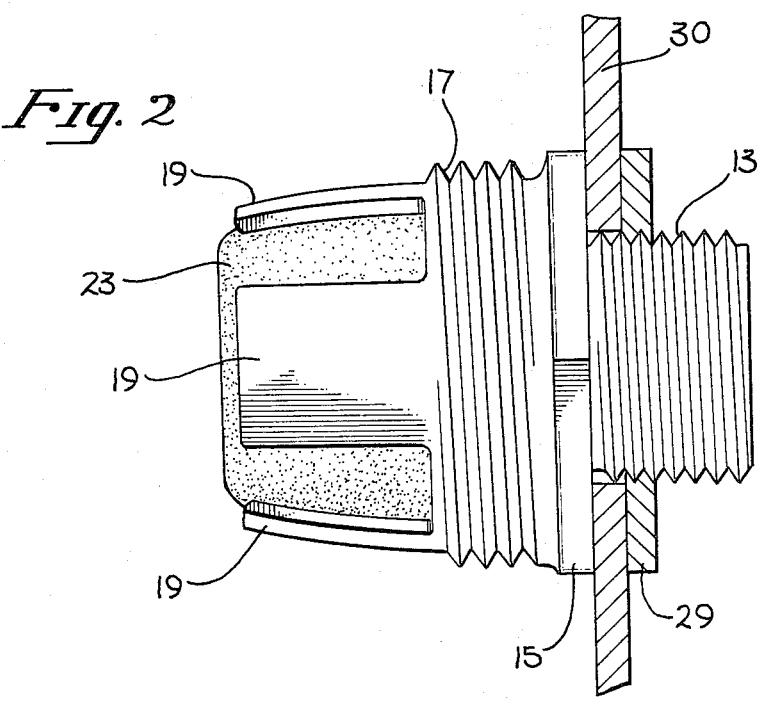
FIG. 2 is a side elevation view of the clamp including the elastomeric member.

As shown in FIG. 2, a generally tubular elastomeric member 23 is disposed between the inner and outer rows of projections. The elastomeric member 23 extends from approximately the ends of the projections 19 and 21 adjacent the second threaded portion 17 along the length of the projections and protrudes slightly past the end of the clamp adjacent the projections.

Figure 3:
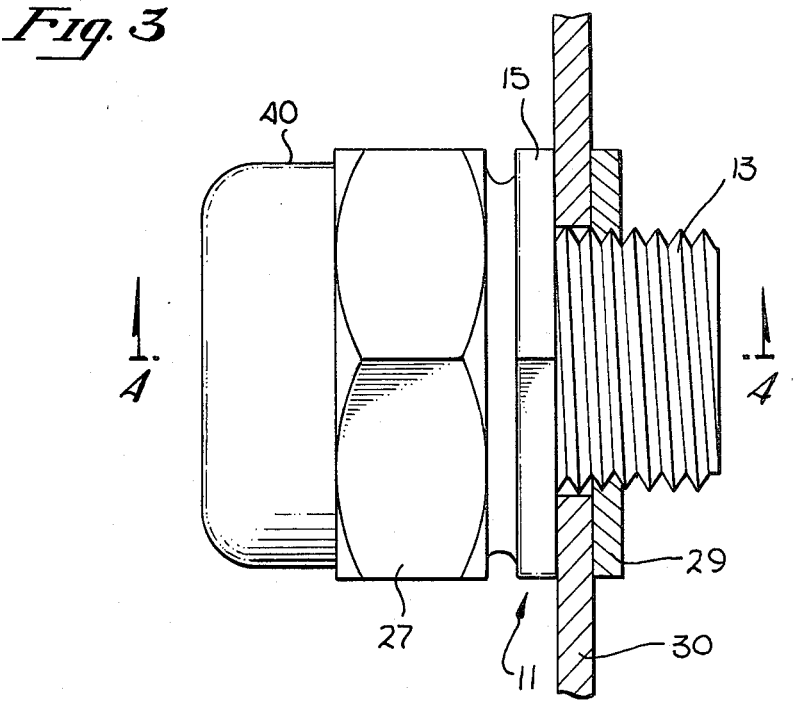
FIG. 3 is a side elevation view of the clamp including the elastomeric member and the cable securing nut.
Figure 4:
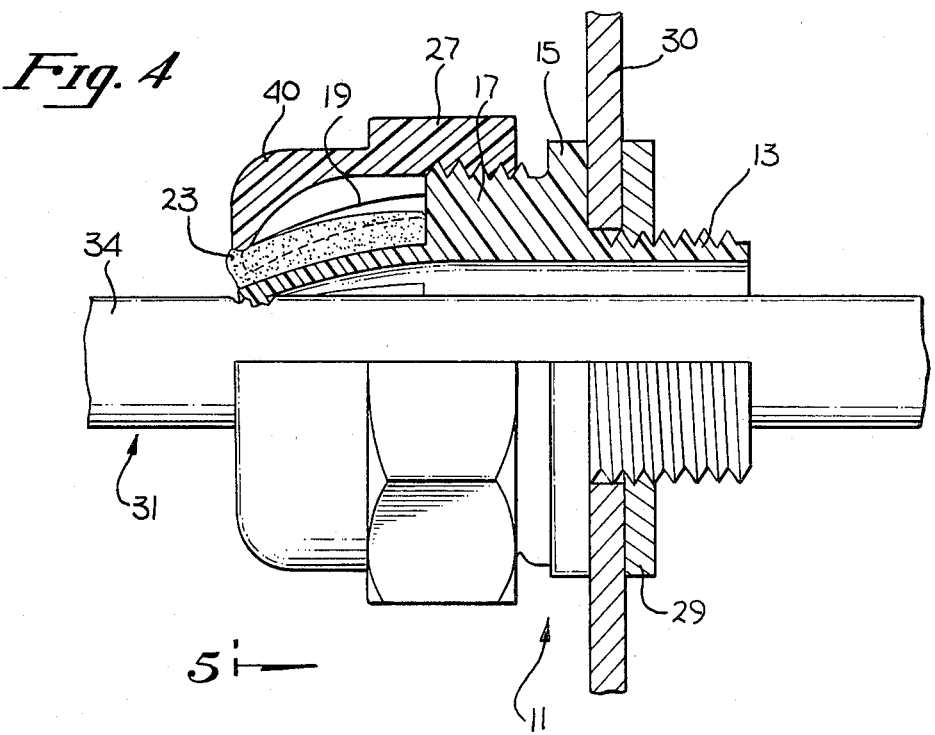
FIG. 4 is a plan view of the clamp and the cable securing nut taken along line 4—4 of FIG. 3.

Referring now to FIGS. 3 and 4, a coupling unit 27 is threadedly coupled to the second threaded portion 17 for securing a cable to the clamp as described more fully below. A locking nut 29 is threadedly coupled to the first threaded portion 13 for securing the clamp 11 to a wall 30 or the like by engaging one side of the wall, while the flange 15 engages the other side of the wall.

The securing and moisture resistant sealing action of the cable clamp 11 can best be described with reference to FIGS. 4, 5 and 6. A cable 31 having an outer sheath 34 and conductors 36 is passed through an opening along the longitudinal axis of the clamp. Depending on the outside diameter of the cable 31, the cable may pass freely through the clamp 11 without making substantial contact with the inner portion of the clamp or it may engage the inner row of projections 21 inasmuch as the projections taper towards one end of the clamp. Larger diameter cables may push the inner row of projections 21 and indirectly push the outer row of projections 19 in a radial direction away from the longitudinal axis of the clamp.

Once the cable 31 is passed through the clamp 11, coupling nut 27 is tightened onto threads 17. Coupling nut 27 has a shoulder 40 at the end of the nut opposite its threaded end. Shoulder 40 terminates in a circular edge 43, which edge has a diameter slightly larger than the smallest diameter of the tapered outer projections 19 of the clamp 11. Inasmuch as the diameter of the circular edge 43 is fixed and the diameter of the projections 19 increases as the projections approach the threads 17, the circular edge increasingly bears against the outer projections as the coupling nut is tightened onto the threads.

Although the clamps are made of a relatively non-resilient material such as polyvinyl chloride or other weather resistant material, the projections 19 and 21 are moveable within limits, because the connecting surface area between the projections and the body of the clamp 11 is relatively small. Thus, as the coupling nut 27 is tightened, the outer row of projections 19 are directed inwardly thereby applying an inward pressure on the elastomeric member 23 and the inner row of projections 21. As the coupling nut 27 is tightened, the inward movement continues until the coupling nut bears against flange 15, or the edges of the inner and/or outer row of projections abut, or the cable 31 can no longer be compressed by the action of the clamp. Of course, during this time, the elastomeric member 23 is being deformed so as to fill the gaps between the inner row of projections 21 and the gaps between the outer row of projections 19. Teeth 46 on the inner surface of the inner row of teeth 21 increasingly grip resilients heath 34 of cable 31 as coupling nut 27 is tightened to prevent the cable from being pulled out of the clamp.

As best seen in FIG. 5, spaces between the sheath 34 of the cable 31 and the clamp 11 are filled by the elastomeric member 23 when the coupling nut 27 is tightened. Thus, all spaces between the cable 31 and the clamp 11 are filled by a fluid resistant material thereby forming a fluid resistant seal.

In the preferred embodiment there are four substantially identical projections on each row of projections. Of course, each projection 19 on the outer row is somewhat larger than each of the projections 21 on the inner row. Additionally, each projection on the outer row is disposed so that it substantially equally overlaps two adjacent projections on the inner row. The pressure exerted by each row of projections is substantially equally distributed to the elastomeric member and sheath of the cable thereby ensuring a uniform flow of the elastomeric member to fill the gaps between adjacent projections.

Thus, a cable clamp for securing a cable to a wall or the like with provision for a fluid resistant seal has been disclosed. Although certain specifics such as materials of the clamp, and number and shapes of the projections have been described, it will be obvious to those skilled in the art that various changes may be made without departing from the spirit and scope of the subject invention as disclosed and claimed herein.

I claim:
1. A cable securing device comprising:
   (a) a generally tubularly shaped body portion;
   (b) a first plurality of axial projections disposed at one end of said body portion;
   (c) a second plurality of axial projections disposed adjacent said first plurality of axial projections, said second plurality of axial projections defining an inner surface of said tubularly shaped body portion at said one end of said body portion;
   (d) a generally tubularly shaped elastomeric member disposed intermediate said first and second plurality of axial projections;
   (e) means for securing said tubularly shaped body portion to a wall;
   (f) means for forcing said first plurality of axial projections against said elastomeric member, said elastomeric member against said second plurality of axial projections, and said second plurality of axial projections against a sheath of a cable disposed adjacent said inner surface;
   whereby said body portion is secured to said wall and a cable is secured to said body portion, and a fluid resistant seal is formed between said cable and said cable securing device.

2. The cable securing device defined by claim 1 wherein said first plurality of said axial projections and said second plurality of axial projections are tapered with the smaller diameter portions of said axial projections disposed adjacent said one end of said body portion.

3. The cable securing device defined by claim 1 wherein said means for forcing comprises a nut adapted to threadedly engage said body portion adjacent said first plurality of axial projections; whereby said first plurality of axial projections press against said elastomeric member which presses against said second plurality of axial projections, which press against said cable as said nut is threaded onto said body portion, and said cable is releasably secured to said body portion.

4. The cable securing device defined by claim 1 wherein each of said first plurality of axial projections and each of said second plurality of axial projections comprise a generally rectangularly shaped member, each of said generally rectangular shaped members spaced substantially equally apart from its two adjacent rectangularly shaped members which lie in the substantially same tapering circumferential plane.

5. The cable securing device defined by claim 1 wherein said first plurality of axial projections lie in overlapping relationship to gaps between adjacent pairs of said second plurality of axial projections.

6. A cable securing device comprising:
(a) a generally tubularly shaped body portion;
(b) a first plurality of tapering, generally rectangular axial projections disposed at one end of said body portion such that each of said first plurality of projections taper towards said one end, each of said first plurality of said projections lying in substantially the same circumferential plane and spaced substantially equally apart from its two adjacent projections of said first plurality of axial projections;
(c) a second plurality of tapering, generally rectangular axial projections disposed adjacent said first plurality of said projection, each of said second plurality of projections lying in substantially the same tapering circumferential plane and spaced substantially equally apart from its two adjacent projections of said second plurality of axial projections, said second plurality of axial projections defining an inner surface of said tubularly shaped body portion at said one end of said body portion, said first plurality of axial projections lying in overlapping relationship to gaps between adjacent pairs of said second plurality of axial projections;
(d) a generally tubularly shaped elastomeric member disposed intermediate said first and second plurality of axial projections;
(e) means for securing said tubularly shaped body portion to a wall;
(f) means for forcing said first plurality of axial projections against said elastomeric member, said elastomeric member against said second plurality of axial projections, and said second plurality of axial projections against a sheath of a cable disposed adjacent said inner surface;

whereby said body portion is secured to said wall and a cable is secured to said body portion, and a fluid resistant seal is formed between said cable and said cable securing device.

7. The cable securing device defined by claim 6 wherein said means for forcing comprises a nut adapted to threadedly engage said body portion adjacent said first plurality of axial projections;

whereby said cable is releasably secured to said body portion.

* * * * *